United States Patent
Beck et al.

(10) Patent No.: US 7,107,794 B2
(45) Date of Patent: Sep. 19, 2006

(54) SUCTION FEEDER

(75) Inventors: Michael Beck, Hochheim (DE); Frank Druschke, Mainz (DE); Klaus-Dieter Duch, Taunusstein (DE); Ludwig Duersch, Mainz (DE); Johannes Roettgers, Gau-Algesheim (DE); Anton Winkelmann, Ober-Olm (DE)

(73) Assignee: Schott AG, Mainz (DE)

( * ) Notice: Subject to any disclaimer, the term of this patent is extended or adjusted under 35 U.S.C. 154(b) by 480 days.

(21) Appl. No.: 10/332,837

(22) PCT Filed: Jul. 4, 2001

(86) PCT No.: PCT/EP01/07625

§ 371 (c)(1),
(2), (4) Date: Jan. 13, 2003

(87) PCT Pub. No.: WO02/06169

PCT Pub. Date: Jan. 24, 2002

(65) Prior Publication Data

US 2003/0145627 A1 Aug. 7, 2003

(30) Foreign Application Priority Data

Jul. 19, 2000 (DE) .............................. 100 34 999

(51) Int. Cl.
*C03B 7/18* (2006.01)
(52) U.S. Cl. .................. 65/210; 65/374.11; 65/374.12
(58) Field of Classification Search .................... 65/73, 65/124, 125, 134.2, 134.9, 135.1, 135.6, 65/210, 324, 346, 374.11, 374.12
See application file for complete search history.

(56) References Cited

U.S. PATENT DOCUMENTS

| | | | | |
|---|---|---|---|---|
| 1,916,666 A | * | 7/1933 | Honiss | 65/124 |
| 2,310,715 A | * | 2/1943 | Soubier | 65/74 |
| 3,266,881 A | * | 8/1966 | Novack et al. | 65/130 |
| 4,690,781 A | * | 9/1987 | Heimerl et al. | 588/11 |
| 4,780,121 A | * | 10/1988 | Matesa | 62/134 |
| 4,820,329 A | * | 4/1989 | Gunthner | 65/134.4 |
| 5,785,726 A | * | 7/1998 | Dorfeld et al. | 65/134.1 |
| 6,119,484 A | * | 9/2000 | Takei et al. | 65/134.2 |
| 6,332,339 B1 | * | 12/2001 | Kawaguchi et al. | 65/134.2 |
| 2003/0051509 A1 | * | 3/2003 | Sakai et al. | 65/157 |

FOREIGN PATENT DOCUMENTS

| | | |
|---|---|---|
| DE | 21 61 885 B | 12/1972 |
| DE | 42 02 278 A1 | 7/1993 |

* cited by examiner

*Primary Examiner*—Sean Vincent
(74) *Attorney, Agent, or Firm*—Michael J. Striker

(57) ABSTRACT

The suction feeder for glass processing includes a housing containing a material; a heatable noble metal or noble metal alloy feed line embedded in the housing in a thermally insulated fashion; a connection element at one end of the feed line for connection with a molten glass supply device and an outlet element for operative engagement with a suction device at the other end of the feed line. To prevent aspiration of bubbles through the feed line the material together with the housing surrounds the heatable feed line and has a composition and/or structure such that in operation a negative pressure can be produced on an outer side of the feed line. Preferably this negative pressure is lower than a minimum internal pressure within the feed line that is established during a suction process.

11 Claims, 3 Drawing Sheets

SUCTION FEEDER

BACKGROUND OF THE INVENTION

The invention relates to a suction feeder for glass processing, with a feed line of noble metal or a noble metal alloy which is heatable in operation and is embedded, in thermally insulated fashion, in a housing that has a connection element for connection with a delivery device for molten glass and an outlet element for operative engagement by a suction element, in particular a suction ball, that takes a gob of glass from the feed line.

In the production and processing of glass, molten gobs of glass are typically needed as the starting product. In most glass processing facilities, the glass is taken by glassmakers from an open surface, from so-called front fixtures. However, it is also known for the gobs of glass to be taken from droplet feeders or suction feeders. In these suction feeders, to which the invention draws its attention, the gob of glass is generated from a melt by suction. These suction feeders are used in both the channel region and the feeder region.

In FIGS. 2 and 3, two typical known suction feeders are shown. The suction feeder of FIG. 2 comprises a tube 1, made from a noble metal (alloy), which is surrounded by a plurality of layers 2, 3 of refractory material, that is, a backing composition 2 and an insulation 3. Together, they are built into a steel chest 4, which lends the overall structure the requisite stability. The noble metal tube 2 itself is heated directly with the aid of alternating current, in that the requisite heating current is fed in via two or more flanges 5, 6 (depending on the length of the assembly). As a rule, this noble metal tube 2 is curved upward by 90°. The suction feeder is designed such that the level of glass in the entire system is just at the upper edge of the upper flange 6. As a rule, so-called suction rings are also placed on this flange 6, the diameter of these rings being selected as a function of the range of articles involved. In this technology, the possible vaporization of the glass at hot open surfaces is reduced to a minimum.

A so-called suction ball 7, whose diameter is also dependent on the article involved, is placed on the upper flange 6, or on the associated suction ring, and with the aid of a predefined negative pressure, this ball aspirates the glass from the noble metal tube 2, which is what has led to its being called a "suction feeder". Once the suction ball 7, after a predetermined course of pressure and time, is filled with glass, it is lifted from the suction feeder, and the gob of glass contained in it is carried elsewhere for further processing. As a rule, the further processing is done by glassmakers, and the gob of glass is either blown up or compressed.

The suction feeder can be positioned at any arbitrary point on an existing glass distribution and channel system. The attachment is done either at a so-called brick part 8 with a corresponding through bore, or directly to a platinum channel.

The curved noble metal tube 1 has a typical diameter of about 120–300 mm, for a length of approximately 500–1000 mm; usually, it tapers conically from the entrance site of the glass to the outlet. The magnitude of the diameter is dependent on the desired range of articles, and discontinuous withdrawal must be taken into account along with the requisite heating capacity (process temperatures and heat balance in the apparatus).

For small gobs (articles) of glass that can still readily be picked up by glassmakers ($\leq$=15 kg), the suction feeder of FIG. 2 is as a rule used. For larger gobs (up to 150 kg, again with processing by a glassmaker using a special machine), a suction feeder of FIG. 3 is used, that is, a combination of a container 9 (so-called bowl) made of refractory bricks, and a noble metal cone 10 seated on the container. The noble metal cone 10 is again heated directly; the brick container 9 is heated via a electrode heater that heats the glass directly.

Compared to the still widespread technique today of withdrawing glass from front fixtures, in suction feeders, by the use of noble metals (noble metal alloys), the temperatures required for the process can be established better and more stably. However, if there is a refractory lining of the feeder, then because the heater heats the volume of glass asymmetrically, it can happen that glass of different temperatures is united in one article, causing so-called "cold streaking", which can be avoided by means of a suitable, adapted temperature control. Bits of brick, streaking, or bubbles resulting from corrosion of the refractory material are also found in the product. These bubbles originate in the corrosion of the refractory material itself.

The avoidance of bubbles, which pass through porous refractory materials from outside into the glass melt, is described in a German Patent DE 42 02 278 C2. The bubble problem caused by porous refractory materials can be avoided if only very dense material (with stability to corrosion at high temperatures) is used in contact with the glass.

In practice, still other inadequacies, which can have an extremely adverse effect on the glass quality, are linked with the above-described known suction feeders shown in FIGS. 2 and 3.

The first problem is the stability of the noble metal components used, that is, the tube 1 and cone 10:

In use in the glass melt, a maximum temperature must not be exceeded. The closer one gets to the melting temperature of the applicable material, the lower is its mechanical stability. At the typical temperatures in use in the glass melt (at least for special glasses, which require a comparatively high temperature), platinum becomes soft and then has a consistency similar to paper. The mechanical stability then permits only a very limited duration of use. To improve the mechanical stability, the noble metal tubes are provided with so-called beads. Additionally attached reinforcing rings, which are anchored in the refractory material behind them, provide additional stability, but this has an adverse effect on the heat balance.

By means of the negative pressure applied to the glass side during the suction process in the interior of the noble metal component 1 and 10—the buildup and reduction of the negative pressure takes place within only seconds—the noble metal envelope is exposed at periodic intervals to severe pressure fluctuations, since atmospheric pressure always prevails on the outside of the noble metal envelope and particularly in the vicinity of the suction ball 7 can cause the component to collapse. This changes the temperature conditions, and as a restricts the throughput so severely restricted that production is no longer possible. This problem becomes even more serious at weld seams and with long use, since the material is additionally made brittle by the high temperatures and the glass attack, and the initial stability is severely reduced. Thus until now, only suction feeders with relatively small diameters have been used.

The second problem is aspirated air bubbles:

The suction feeder unit is located directly at the point of transfer to postprocessing, so that at this position there is no longer any opportunity of removing existing bubbles from the glass melt.

Above all, in the embodiment of FIG. 3, there are several critical positions where air bubbles can be aspirated from outside because of the negative pressure prevailing in the glass composition. On the one hand, these are the connections between the noble metal cone 10 and the fireproof bowl 9 and the feed-throughs for the thermocouples in the bowl, where cracks can develop, along with the bores for the heating electrodes. Although glass is capable of penetrating into seams and cracks, thereby sealing them, still the course of the temperature and negative pressure differs from one article to another, making for unstable sealing or vitrification and allowing the aforementioned aspiration of air bubbles.

Since as a rule the noble metal components 1, 10 are embedded in a backing composition 2 of a ceramic material, known by the tradename "Quarzal", which because of the curing process is not completely leakproof, air can also be aspirated through cracks occurring in these noble metal components as a consequence of embrittlement from long usage or from chemical or mechanical attack.

SUMMARY OF THE INVENTION

The object of the invention is to embody a suction feeder for glass processing, with a feed line of noble metal or a noble metal alloy which is heatable in operation and is embedded, in thermally insulated fashion, in a housing that has a connection element for connection with a delivery device for molten glass and an outlet element for operative engagement by a suction element, in particular a suction ball, that takes a gob of glass from the feed line, in such a way that the above-described pressure stresses are avoided or at least reduced, and no air bubbles are aspirated.

According to the invention, this object is attained in that the material surrounding the feed line is embodied structurally and/or in terms of material such that in operation a negative pressure can be developed at the outer circumference of the feed line.

Compared to the atmospheric pressure that prevails in the prior art, reducing the external pressure at the feed line reduces the pressure stress on the feed tube, and if pressure equality prevails, then no mechanical stress occurs. Moreover, the external negative pressure prevents the aspiration of air bubbles.

Structurally, the provision according to the invention can be solved especially simply, in a refinement of the invention, if the housing is embodied as a vacuum-tight metal housing, to which at least one neck for connection to a suction pump is attached.

By a suitable choice of a suction pump, i.e., a vacuum pump, that can be connected to the neck, the desired negative pressure can be established in the metal housing, which is preferably of steel.

The pressure stress on the feed line can be kept especially slight if in a feature of the invention, in operation, a negative pressure in the range from 1–900 mbar, preferably in the range between 50 and 400 mbar, can be established on the outside of the feed line.

In a further feature of the invention, it is advantageous if the external negative pressure at the feed line is lower than the minimal internal pressure established during the suction process. As a result, the feed line is in a sense "blown up" somewhat from its inside and is thus additionally stabilized.

In a refinement of the invention, it is advantageous if for thermal insulation of the feed line, at least one refractory layer of a material of high porosity is provided. A refractory layer with a material of high porosity not only assures good thermal insulation but also has the particular advantage that the entire system can be rapidly pumped out to the desired negative pressure, without requiring special structural provisions for developing the negative pressure on the outside of the feed line.

In the case of the suction feeder of the invention, as in the prior art, the feed line can be embodied either as a tube curved in operation upward by 90° and tapering conically, or alternatively as a conical part that tapers toward the top.

Advantageously, the connection and outlet elements are embodied as flanges.

If a direct electrical heating for the feed line is provided, then the connection flanges are mounted in insulated form on the housing. If indirect or inductive heating is provided, then the connection flanges can advantageously be welded directly to the housing.

BRIEF DESCRIPTION OF THE DRAWING

The objects, features and advantages of the invention will now be illustrated in mare detail with the aid of the following description of the preferred embodiments, with reference to the accompanying figures in which.

DETAILED DESCRIPTION OF THE INVENTION

Figure 1:
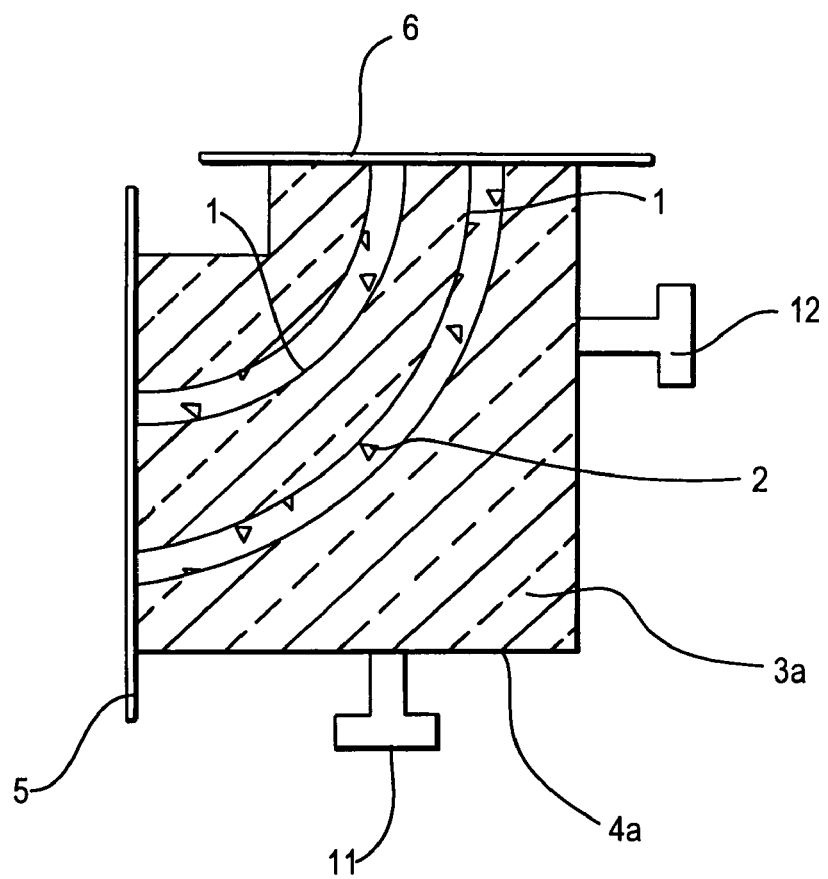
FIG. 1 is a cross-sectional view of an exemplary embodiment of the suction feeder according to the present invention.
Figure 2:
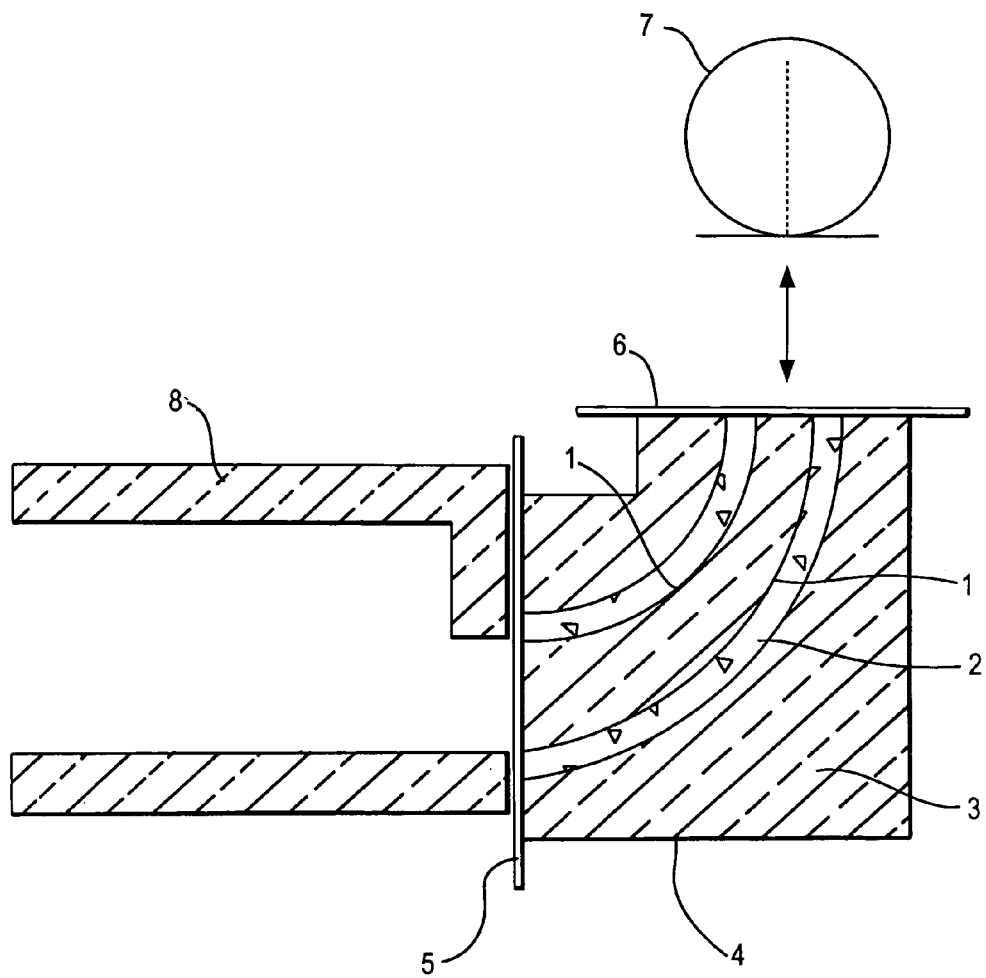
FIG. 2 is a cross-sectional view of a suction feeder of the prior art.

FIG. 1, in a schematic sectional view, shows one exemplary embodiment of the invention based on the embodiment of the suction feeder of FIG. 2, with a tube 1 of noble metal, or an alloy thereof, as the feed line, which is curved upward by 90° and shaped to taper conically. The components that match the suction feeder of FIG. 2 are identified by the same reference numerals.

Figure 3:
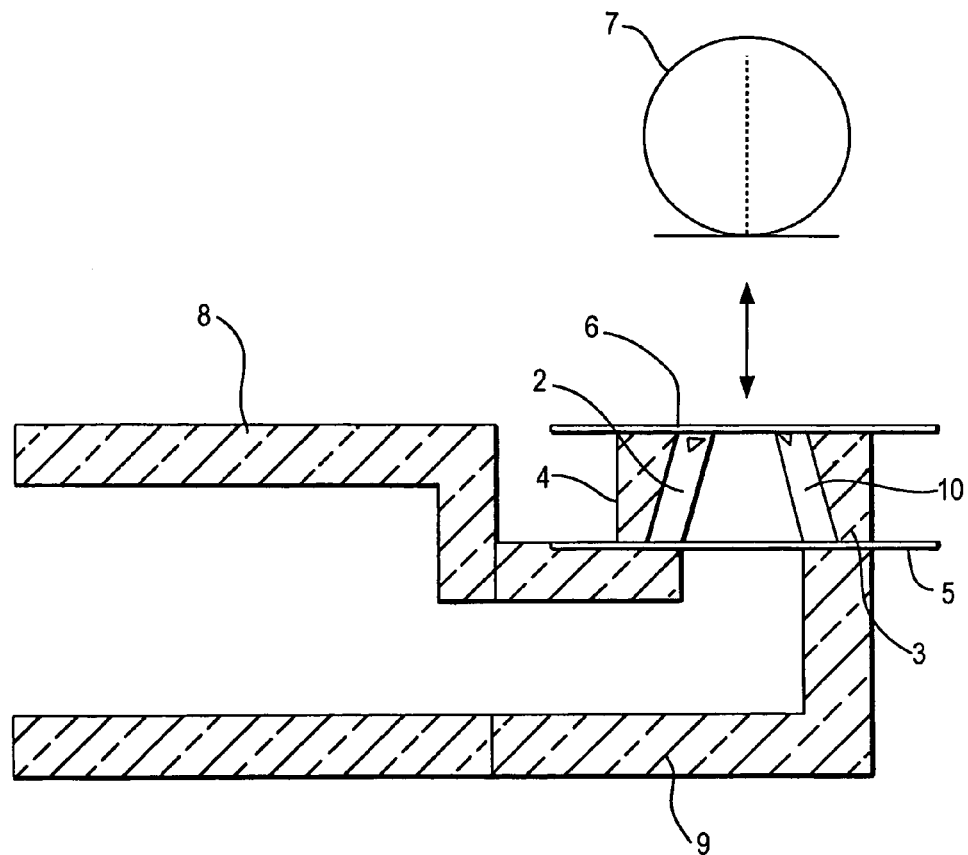
FIG. 3 is a cross-sectional view of another suction feed known in the prior art.

Correspondingly, the provisions according to the invention can also be employed in a suction feeder of FIG. 3, with a platinum cone 10.

The invention is based on the recognition that the negative pressure difference in the suction process between the inner, glass-carrying side of the noble metal component 1 and 10 and its outside is the source of the problems described above (stability of the feed line, aspiration of air bubbles).

According to the invention, this pressure difference is avoided by applying a negative pressure to the outside of the noble metal component as well. This can be achieved most simply in accordance with FIG. 1 by providing that the outside of the noble metal component 1, together with the refractory lining 2, 3a is surrounded by a vacuum-tight steel chest 4a, which is pumped out via necks 11, 12. The pressure stress is thus eliminated, and air bubbles can no longer be aspirated. It is even advantageous for the negative pressure prevailing there to be reduced still further to below the suction pressure, because as a result the noble metal component 1 is "blown up" somewhat from its inside and is thus additionally stabilized.

With this method, it is possible to dispense entirely with a refractory version of the feeder structure in this region, so that a range of articles previously inaccessible to the purely noble metal suction feeders can now be produced.

The pumps (not shown) for furnishing the requisite negative pressure on the outside of the noble metal component 1 can also, because of the suction capability, readily control any leaks in the lining 2, 3*a*. Because of the requisite current supply lines in the case of direct heating of the noble metal component 1, such leaks always exist, because at the high usage temperatures involved here, there is no electrically insulating material that guarantees 100% vacuum-tightness. Conversely, standard thermocouples and pressure measurements can be installed in vacuum-tight fashion. In the case of direct heating, an alternating current of 50 Hz is the most-economical solution. If vacuum-tightness is especially important, then indirect heating, such as inductive heating, can also be used. In that case, the inlet and outlet flanges 5, 6 can be welded directly to the vacuum housing 4*a*.

The noble components 1, 10 are expediently backed (as is already usual) with the Quarzal composition 2. This is adjoined toward the outside by one or more porous refractory layers, which on the one hand, because of their high porosity, serve as thermal insulation, and on the other have the great advantage of enable rapid pumping out of the entire system to the desired negative pressure, so that no structural provisions in the interior of the vacuum container are needed in order to be able to build up the negative pressure quickly directly at the outside of the noble metal component 1. So-called lightweight refractory bricks are especially suitable as materials.

It is appropriate for the external negative pressure to be built up before the glassmakers begin their work.

For the noble metal tube 1 of FIG. 3, the following parameters preferably apply:

material: all noble metals (alloys), preferably Pt, PtRh 10–30 material thickness: 0.1–30 mm, preferably 0.5–3 mm.

tube dimensions: diameter, 1–1000 mm, preferably 50–400 mm tube length: 100–5000 mm, preferably 500–1500 mm tube heating: direct or indirect (for instance, inductive)

The number of refractory materials for the lining 3*a* is from 1 to 10, preferably from 2 to 3; porous materials are to be preferred, because of their lower thermal conductivity and their fast evacuation times.

The negative pressure range on the outside of the noble metal tube is 1–900 mbar, preferably 50–400 mbar; the external pressure is preferably lower than the minimal internal pressure established during the suction process.

The invention claimed is:

1. A suction feeder for glass processing, said suction feeder comprising
    a housing containing a material;
    a heatable feed line embedded in the housing in a thermally insulated fashion, said heatable feed line being made of noble metal or a noble metal alloy;
    a connection element for connection with a delivery device for molten glass, said connection element being connected to one end of the feed line; and
    an outlet element for operative engagement with a suction device connected to another end of the feed line opposite to the connection element at the one end, said suction device comprising means for taking a gob of glass from the feed line;
    wherein said material together with said housing surrounds the heatable feed line and said material has at least one of a composition and a structure, such that in operation a negative pressure can be produced on an outer side of the feed line.

2. The suction feeder as defined in claim 1, further comprising at least one neck for connection to a suction pump for producing said negative pressure, and wherein said housing is a vacuum-tight metal housing, except that said at least one neck is connected to said housing, so that said negative pressure is produced on said outer side of said feed line by said suction when said suction pump is connected to said at least one neck and operated.

3. The suction feeder as defined in claim 1, wherein said negative pressure on said outer side of said feed line is in a pressure range from 1 to 900 mbar 4. The suction feeder as defined in claim 3, wherein said pressure range is from 50 to 400 mbar.

5. The suction feeder as defined in claim 1, wherein said negative pressure on said outer side of said feed line is lower than a minimum internal pressure within the feed line that is established during a suction process.

6. The suction feeder as defined in claim 1, wherein said material comprises at least one refractory layer and said at least one refractory layer consists of a high porosity substance.

7. The suction feeder as defined in claim 1, wherein said feed line is a tube having an upwardly curving 90° bend and said tube conically tapers.

8. The suction feeder as defined in claim 1, wherein said feed line comprises a conical part that tapers toward a top thereof.

9. The suction feeder as defined in claim 1, wherein said connection element and said outlet element are respective flanges connected at said one end and said another end of said feed line respectively.

10. The suction feeder as defined in claim 1, further comprising an electric heater for said feed line.

11. The suction feeder as defined in claim 1, further comprising an inductive heater for said feed line.

* * * * *